United States Patent
Rossetti

[15] 3,689,022
[45] Sept. 5, 1972

[54] APPARATUS FOR THE PRODUCTION OF CASE POLYMER SHEETS

[72] Inventor: Carlo Rossetti, c/o Rostero S.A., Acacias, 12, Av. Industrielle, Geneva, Switzerland

[22] Filed: Nov. 1, 1971

[21] Appl. No.: 194,464

Related U.S. Application Data

[60] Division of Ser. No. 55,184, July 15, 1970, Continuation-in-part of Ser. No. 880,500, Dec. 11, 1969, Pat. No. 3,551,541, Continuation-in-part of Ser. No. 534,525, March 15, 1966, abandoned.

[52] U.S. Cl. ............... 249/81, 264/319, 249/134, 425/405, 425/447
[51] Int. Cl. .................... B29d 7/08, B29d 7/02
[58] Field of Search............264/102, 219, 313, 319; 249/81, 134, 119; 425/405, 447, 182, 186, 117, 116, 175, 256, 384, 436, 450

[56] References Cited

UNITED STATES PATENTS

| | | |
|---|---|---|
| 1,996,049 | 3/1935 | Pownall ............... 249/81 X |
| 2,688,158 | 9/1954 | Staratton ............. 249/81 X |
| 3,165,786 | 1/1965 | Yogi et al. ............... 249/81 |

*Primary Examiner*—Robert L. Spicer, Jr.
*Attorney*—John J. McGlew et al.

[57] ABSTRACT

Hollow metal plates, each formed with an interior flow passageway for circulating a fluid heat transfer medium, are used in apparatus for producing cast polymer sheets which includes a casting chamber. The plates are mode of iron or preferably of a light metal, such as aluminum and aluminum alloys, and are constructed of a frame, plates and dividers secured together by epoxy resin to form a sealed flow passageway. Means are arranged to equalize the pressure in the flow passageway and the pressure in the casting chamber of the apparatus.

2 Claims, 5 Drawing Figures

PATENTED SEP 5 1972 3,689,022

SHEET 1 OF 2

APPARATUS FOR THE PRODUCTION OF CASE POLYMER SHEETS

RELATED U.S. APPLICATIONS

This is a division of application Ser. No. 55,184 filed July 15, 1970.

This is a continuation-in-part of application Ser. No. 880,500, filed Dec. 11, 1969, now U.S. Pat. No. 3,551,541 which was a continuation of application 534,525, filed Mar. 15, 1966; now abandoned.

This invention generally relates to plastics and is particularly directed to a novel apparatus for producing cast polymer sheets.

The invention is generally applicable to the production of cast polymer or synthetic resin sheets obtained by the polymerization of a monomeric material with resulting increase of the specific weight of the material and decrease in volume. However, the invention is particularly applicable to the production of cast sheets of a polyalkylmethacrylate and their copolymers obtained by the polymerization of the corresponding monomer, as for example methyl methacrylate.

It has previously been proposed to cast polymethylmethacrylate sheets by polymerizing monomeric or partially polymerized methylmethacrylate in sheet casting molds. The sheet casting molds according to these prior art proposals are generally constructed of two parallel heat resistant glass plates, separated by a compressible gasket to allow for shrinkage. The monomeric material which may be admixed with a prepolymer, to wit, partially polymerized monomer, is introduced into the casting mold, i.e., between the glass plates, in the form of a viscous casting liquid. The polymerization between the glass plates is then effected by subjecting the mold to heat while the glass plates are clamped together. It is well known that careful control of the polymerization is necessary in order to obtain a bubble-free product of good optical clarity. In conducting the polymerization, allowance has to be made for an appreciable decrease in the volume which may be over 20 percent. The amount of shrinkage usually decreases as the size of the alcohol portion of the ester increases. Furthermore, the polymerization has to be conducted so as to remove dissolved gases and the highly exothermic polymerization reaction must be carefully controlled (see "Polymers and Resins" by Brage Golding, Van Nostrand Company, 1959, pages 457 and 458).

Dependent on the thickness of the sheets to be produced, the distance between the two glass plates of the molds is determined by the thickness of the compressible gasket or sealing cord, the amount of monomeric material to be introduced between the plates and the clamping pressure of the clamping means which urge the two mold plates towards each other.

When the polymerization is to be initiated, the charged molds are either inserted into a furnace which is heated by circulating hot air or they are placed into a hot water bath. Experience has demonstrated that with the prior art molds the best results are obtained if the plates extend in a horizontal plane during polymerization so as to negate as much as possible the hydrostatic pressure of still liquid monomer or prepolymer which has a tendency to cause outward bulging of the glass plates. After the polymeric substance between the plates has assumed a gel-like consistency, the molds are usually transported into a second furnace where the material is subjected to a second polymerization step. This additional afterpolymerization takes place at higher temperatures. When the desired degree of polymerization has been obtained, the molds are conveyed to a third furnace in which they are treated with steam. The steam has a tendency to penetrate between the glass plates and the polymeric sheets formed, thus facilitating detachment and removal of the glass plates from the cast sheets.

It will be appreciated that this prior art procedure, which has been generally adopted by the industry with certain variations and modifications for the production of cast sheets of the indicated nature, is relatively cumbersome.

It is extremely important to control the progress of the polymerization throughout the procedure and to create suitably mild thermic conditions which, in turn, requires speedy and effective dissipation of excess heat.

It will be appreciated that, due to the low heat capacity of air, effective control of the thermic conditions during the procedure is very difficult if the heating is effected by circulating air. Nevertheless, hot air, as the source of heat for the polymerization, is predominantly used in the industry because immersion of the molds in water causes several other problems which are difficult to overcome. The water may thus penetrate into the molds and water-immersion type polymerization processes require additional apparative investment.

In accordance with the invention disclosed in the above mentioned application Ser. No. 880,500, the problems and drawbacks of the prior art have been overcome by the casting of the resin sheets in an apparatus which includes a pressure-and vacuum-resistant casing or housing. The housing defines a chamber which accommodates a number of hollow metal plates. The metal plates extend within the chamber in substantially vertical, parallel orientation and are laterally movable. In a preferred embodiment, the metal plates are suspended from a rail which traverses the upper portion of the chamber, the individual plates being suspended from the rail by pulleys or the like. The hollow metal plates, in turn, have projecting bottom ledges or abutments for supporting the bottom edge of glass plates. Each glass plate bears with surface contact against the adjacent metal plate and is detachably attached thereto by means of hooks, spring clips or the like. A battery of such hollow metal plate - glass plate assemblies is suspended from the rail so that two glass plates are arranged between any two adjacent metal plates, a casting space being formed between adjacent glass plates. Casting liquid or syrup is introduced into the space between adjacent glass plates, the marginal portions of the glass plates being sealed by gaskets, sealing cords, or the like, with the top, however, being left open. Any two adjacent glass plates sandwiched between metal plates thus form a mold, the casting space being defined by the gasket. The projecting bottom ledges of the metal plates are preferably smooth or polished so as to facilitate movement of the glass plates on these ledges. It is also feasible to provide small rollers or balls on the bottom ledges, particularly if the glass plates are heavy, so as to facilitate the movability of the glass plates thereon.

The gasket material must be insoluble in the particular resin material. The thickness of the gaskets or compressible sealing cord will, of course, be dependent on the thickness of the sheets to be cast. Generally, however, it should be slightly thicker than the sheets to be produced so that effective sealing will take place at the time the glass molds are assembled, to prevent leakage of casting liquid.

The hollow metal plates are also preferably provided with laterally projecting spacers to facilitate the adjustment of the distance to the next adjacent metal plate and thus of the space between the adjacent glass plates.

After the spacers have been adjusted and the casting liquid has been poured into the glass molds, the entire assembly is pushed together in the manner of a filter press. For this purpose, suitable pusher or clamping means are provided within the housing.

A fluid such as, for example, water is then circulated through the hollow metal plates, the temperature of the water being adjustable and controllable, for example, by means of suitable heat exchange means or the like. In order to increase the heat exchange between the metal plates and the glass plates, the outer surfaces of the metal plates should be smooth and plane so that good contact between the metal plates and the glass plates takes place.

The fluid circulation through the metal plates should be effected so that substantially the same temperature prevails over the entire surface of the respective metal plates, thereby uniformly transferring heat to or taking up heat from the associated glass plates.

Since uniform and controlled temperature distribution is of the essence for a successful performance of the polymerization, the speed of the circulating liquid through the metal plates is important. Experience has demonstrated that the speed of the liquid through the metal plates should preferably be such that the entire volume of the liquid within each metal plate is exchanged at least once every five minutes. It has been found that the cavity or hollow space of the metal plate should preferably be divided to form a tortuous flow passage, thereby preventing laminal flow with dead spaces.

Up to the present time the hollow metal plates have been assembled from steel plates, frames and divider members which were welded together to form the sealed flow passage for the heat transfer fluid. To afford the requisite accuracy in the formation of the cast resin plates, it has been necessary to provide the steel plates with very smooth planar surfaces. Such surfaces have required careful working which, of course, has considerably increased the cost of the production of the plates.

The use of steel plates has been further aggravated by the size of the plates needed to accommodate the pressure differentials between the heat transfer fluid within the hollow metal plates and the pressure conditions within the casting chamber. Considering that the plates may present a 6 × 8 foot surface, the pressure differential may total many tons with the result that massive steel plates have been required.

Another factor which complicated the use of steel members for the hollow metal plates was the welding of the plates, frame and dividers together, though such welding afforded stability for the assembled plates. The high temperature differentials developed in the welding operations have a tendency to cause distortion of the various components forming the hollow metal plates which, in turn, must be corrected by expensive and cumbersome metal working procedures. Accordingly, it is a primary object of the present invention to overcome the problems presented by the use of hollow steel plates and/or to provide a light weight hollow metal plate construction which does not require welding and provides smooth planar surfaces without additional metal working procedures.

Therefore, in accordance with the present invention, hollow metal plates are constructed of iron or preferably of light metals, such as aluminum and aluminum alloys, for example "ANTICORODAL," an aluminum-magnesium alloy. To avoid any problems of distortion which resulted from welding the components of the metal plate, an epoxy resin is used for securing the components together and forming a sealed flow passageway within the plate member.

Further, to eliminate any increase in the size of the light metal components because of pressure differentials, a pressure equalizing system is provided between the heat transfer medium flowing through the hollow metal plates and the pressure conditions within the casting chamber.

The various features of novelty which characterize the invention are pointed out with particularlity in the claims annexed to and forming a part of this specification. For a better understanding of the invention, its operating advantages and specific objects attained by its use, reference should be had to the accompanying drawings in which there is illustrated and described a preferred embodiment of the invention.

Figure 1:
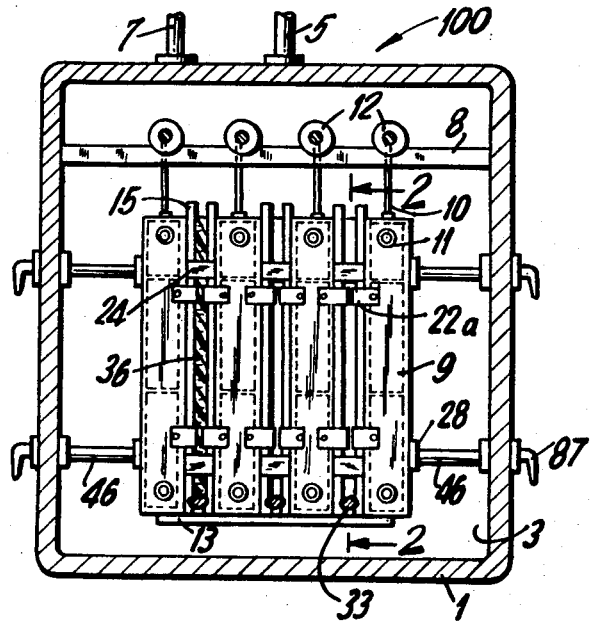
FIG. 1 is a vertical section through a sheet casting apparatus embodying the invention.
Figure 2:
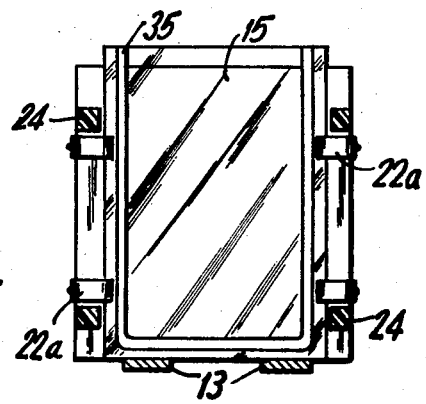
FIG. 2 is a section along line 2—2 of FIG. 1.

Referring now to the drawings, the inventive apparatus for casting resin sheets, as illustrated in FIG. 1, is generally indicated by reference numeral 100 and includes a housing or casing 1 forming a casting chamber. The housing is of steel or the like metal, is pressure- and vacuum-resistant, and has a door, not shown, for permitting access to the interior space or chamber 3 of the housing. When the door is closed it is effectively sealed against the wall of the housing and for this purpose a compressible gasket or the like sealing means, not shown, is provided between the marginal area of the door and the housing. A similar door may also be arranged on the opposite side wall of the housing. The housing has also valve-controlled connections 5 and 7 for selectively connecting the chamber 3 to pressure and vacuum sources, respectively.

A rail 8 traverses the upper portion of chamber 3 and is connected to the housing wall. A number of metal plate members 9 are suspended from the rail, as clearly seen in FIG. 1. For this purpose, each metal plate member 9 is provided with a rod 10, one end of which is secured to the metal plate member 9, as indicated by reference numeral 11, while the other end carries a pulley 12 which runs on the rail 8. In the embodiment illustrated four metal plate members 9 have been shown, but in practice a much larger number may be used. As many as 20 or 30 metal plates may thus be suspended from the rail 8. In view of the pulley suspension arrangement, the metal plate members may be moved laterally along the rail.

Each metal plate member has a bottom ledge or strip 13 which projects laterally for supporting the bottom edge of a glass plate 15. The bottom ledges 13 have a smooth or polished top surface which may be provided with rollers or balls so as to facilitate sliding movement of the glass plates 15 on the ledges 13.

Figure 3:
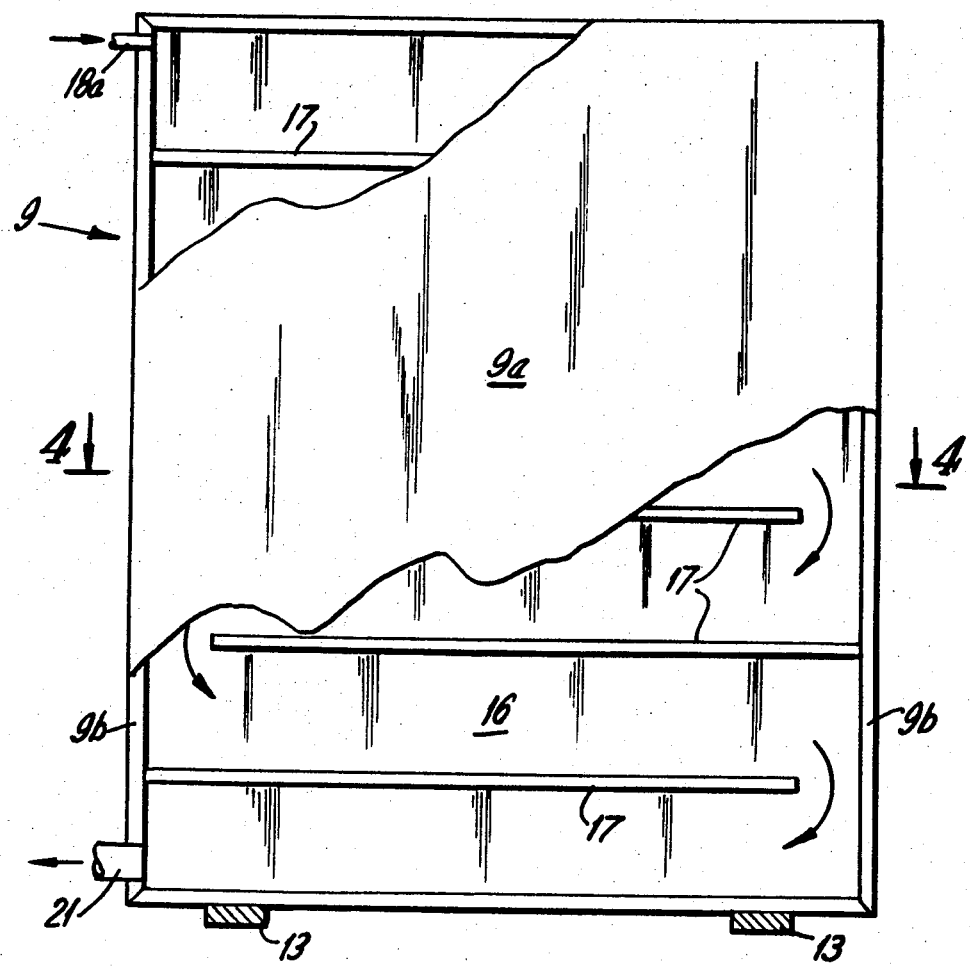
FIG. 3 is an elevational view, partly in section, of a metal plate forming a part of the apparatus in FIG. 1.
Figure 4:
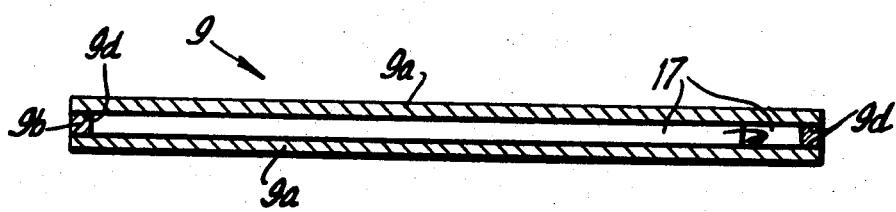
FIG. 4 is a view taken along the line 4—4 in FIG. 3.

The metal plate members 9 as displayed in FIG. 3, all of which are of substantially identical construction, are constructed of a pair of plates 9a disposed in spaced parallel relationship on the opposite sides of a rectangular frame 9b and define an interior space 16 which is divided into several communicating compartments by means of baffles or dividers 17 secured to the plates 9a and extending from one side of the frame and terminating short of the other side to form a tortuous flow passage. The tortuous flow passage facilitates the movement or flow of fluid through the space 16, note the arrows in FIG. 3.

The components of the plate members 9 are formed of iron or of a light metal, such as aluminum and aluminum alloys. One example of a light metal used in forming the components is "ANTICORODAL," an aluminum-magnesium alloy. Instead of welding the components together, as had been done in the past, the plates 9a are secured to the frame 9b by applying a coating of epoxy resin 9d between their contacting surfaces. One example of an epoxy resin which has been used is "ARALDIT," marketed by Ciba, however, any other suitable epoxy resin may be used for securing the components together. Similarly, the dividers 17 are attached to the plates 9a and the frame 9b by means of the epoxy resin 9d. The resin provides a sealed interior space 16 within the plate member 9. In assembling the components together, with their contacting surfaces coated with the epoxy resin, the curing or hardening of the resin is effected, for example, by maintaining the assembly at 140° C. for 12 hours. Because the components of the plate member are secured together by an epoxy resin which does not involve the high temperature differentials present in welding, the distortion problem faced in welding is obviated.

Figure 5:
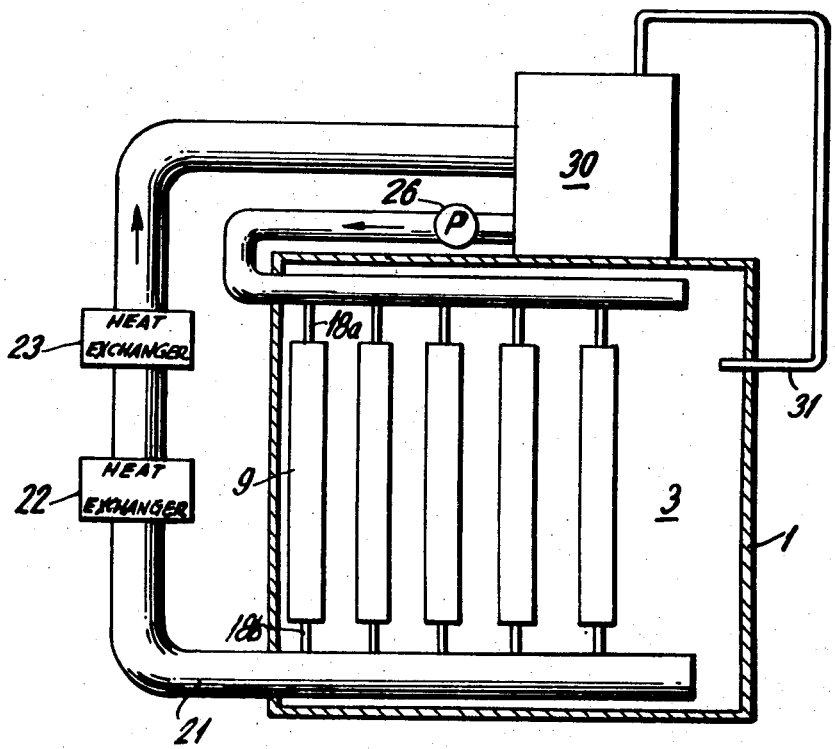
FIG. 5 is a schematic showing of the apparatus illustrated in FIG. 1 with a heat transfer system in communication with the plate members.

Liquid is introduced into the sealed space 16 through an inlet pipe 18a. The liquid, usually water or mineral oil flows through the tortuous flow passage defined by the dividers 17 and exists through an outlet pipe 18b into a conduit 21 to pass through heat exchanging means which preferably should consist of at least two heat exchangers 22 and 23, one for heating and one for cooling, whereafter the liquid again enters the space 16 through pipe 18a, note FIGS. 3 and 5. The heat exchangers can be selectively activated as required, to provide the necessary heat transfer action with the liquid flowing through the circuit. If necessary, valves and by-passes can be placed in the heat exchanging circuit. The circulation of the liquid through the plate members 9 is effected by a pump 26 which can be located within the circuit at any suitable location.

For equalizing pressure conditions within the heat exchanging circuit flowing the liquid through the space 16 with the casting chamber 3, a closed container 30 is located in the heat exchanging circuit in communication with the inlet and outlet legs of the conduit 21. A pipe 31 is connected at one end to the closed container 30, and at its other end opens into the interior of the casting chamber 3. By providing the pressure communication between the casting chamber and the circuit for the liquid flowing through the space 16 in the plate members 9 no pressure differentials can develop between the exterior and interior surfaces of the plates 9a and relatively thin, light-weight sections can be used for these components as compared to the much heavier sections previously required.

Further, to avoid any pressure buildup within the plate member 9, the outlet pipes 18b are of a larger diametrical size than the inlet pipe 18a. Moreover, the liquid used as the heat transfer medium should not boil at a pressure of 200 mm absolute.

It will be appreciated that elements 21, 22, 23 and the flow passage constitute a fluid path. While the means for circulating liquid through one of the plate members 9 has been illustrated in FIG. 5, it will be appreciated that this is a diagrammatic showing and that the flow of liquid through each of the plate members 9 may be conducted centrally by suitable pump- and valve-controlled conduit means. It is recommended that each plate member is supplied with liquid from a collector, the discharge flowing into a second collector.

The glass plates 15 stand with their lower edge on the ledges 13 and are held in surface contact and in a detachable manner against the adjacent surface of the respective metal plate member 9 by means of spring clips or the like 22a. Each of the metal plate member 9 is also provided with spacers 24 to suitably adjust the space between adjacent metal plate members and thus between the glass plates.

The arrangement also includes pusher or clamping means for pushing the metal plate members - glass plates assembly together into a compact unit. These means are in the nature of rods 46 which pass threadedly through the wall of the housing 1 and are provided with terminal disc members 28 bearing against the outer surface of the terminal metal plates 9. Rods 46 have actuating handles 87 outside the housing 1. By turning the handles 87, the metal plate - glass plate assembly within the space 3 can thus selectively be pushed together or spaced apart.

The operation of the apparatus is as follows:

The operator gains access to the interior chamber 3 of the housing 1 through the door 2, adjusts the spacers 24 to the desired setting and places the individual glass plates 15 on the bottom ledge of the respective metal 9. He then adjusts the spring clips 22a to hold the glass plates against the respective exterior surface of the metal plate member 9. The spacers 24 are set and the sealing means, in the form of compressible gaskets or sealing cord, 33 are placed between adjacent glass plates 15 in dependence on the thickness of the sheets to be cast. In the embodiment here shown, the glass plates have marginal grooves 35 to facilitate the insertion of the sealing gasket or cord 33, but in practice it is generally not necessary to provide such grooves since the attachment and setting of the sealing gaskets does not present any problem.

Monomer or monomer admixed with prepolymer in the form of casting liquid is then filled from above into the casting spaces between any two adjacent glass plates 15, as indicated at 36 in the left-hand glass mold - metal plate assembly of FIG. 1.

After all the casting spaces between adjacent glass plates have thus been filled with the casting liquid, the rod mechanisms 46, 87, 28 are rotated until the entire battery of plates has been pushed together to the desired degree, the movement of the individual plates being facilitates by the pulleys 12. The operator then closes the doors 2 in sealing manner.

The casting procedure is set forth in the abovementioned parent application.

What is claimed is:

1. Apparatus for the casting of resin sheets from flowable polymerizable material wherein a casing defines a sealable casting chamber, a plurality of heat conducting hollow metallic plate members, each said plate member defining an interior flow passageway which is arranged for the flow therethrough of a heat transfer medium in indirect heat transfer relationship with the exterior face surfaces of said plate member, and means for supporting said plate members within said casting chamber, wherein the improvement comprises each said plate member comprising a plurality of metallic components assembled together to form the hollow interior flow passageway, and an adhesive non-metallic binding material applied to the contacting surfaces of said metallic components for securing said components together and sealing the hollow interior flow passageway from the casting chamber within which said plate members are positioned, said binding material having a setting temperature so that said metallic components will not be deformed when they are sealed together, a pair of metal plates disposed in spaced facing relationship, a metal frame positioned between and arranged to extend about the edges of said plates for spacing said plates apart and, in combination with said plates, forming the hollow space within said plate member, a plurality of metal dividers disposed in spaced parallel relationship within the hollow space and secured to the interior surfaces of said metal plates, each of said dividers secured at one end to said frame and extending therefrom across the hollow space and terminating therein in spaced relationship from the opposite side of the frame, said dividers arranged within the hollow space for forming a tortuously shaped interior flow passageway therein, said plate members each having an inlet opening connected to one end of the interior flow passageway and an outlet opening connected to the opposite end of the interior flow passageway for circulating a fluid heat transfer medium therethrough, and said outlet opening being larger than said inlet opening to avoid pressure buildup within the interior flow space in said metal plate, conduit means forming a flow circuit disposed exteriorly of each said plate member and connected to said inlet opening and outlet opening thereof for circulating the heat transfer medium therethrough, heat exchange means located within the flow circuit for controlling the temperature of the heat transfer medium flowing therethrough, and a pressure equalizing means interconnecting the casting chamber with the heat transfer medium for equalizing the pressure of the heat transfer medium with the pressure within the casting chamber to prevent pressure differentials between the exterior surface of said plate members and the interior flow passageway within said plate members.

2. Apparatus, as set forth in claim 1, wherein said pressure equalizing means comprises a closed vessel disposed in said heat transfer flow circuit in communication with the heat transfer medium flowing therethrough, and a pipe connected at one end to said close vessel and at its other end to said casting chamber so that it is in communication with the interior of the casting chamber for effecting the equalization of pressure between the casting chamber and the interior flow passageway within said plate members.

* * * * *